United States Patent
Laitinen et al.

(10) Patent No.: US 8,566,910 B2
(45) Date of Patent: Oct. 22, 2013

(54) METHOD AND APPARATUS TO BIND A KEY TO A NAMESPACE

(75) Inventors: Pekka J. Laitinen, Helsinki (FI); Nadarajah Asokan, Espoo (FI); Antti H. Partanen, Ii (FI)

(73) Assignee: Nokia Corporation, Espoo (FI)

( * ) Notice: Subject to any disclaimer, the term of this patent is extended or adjusted under 35 U.S.C. 154(b) by 758 days.

(21) Appl. No.: 12/782,216

(22) Filed: May 18, 2010

(65) Prior Publication Data

US 2011/0289560 A1  Nov. 24, 2011

(51) Int. Cl.
G06F 7/04 (2006.01)

(52) U.S. Cl.
USPC .......................................................... 726/4

(58) Field of Classification Search
USPC .......................................................... 726/4
See application file for complete search history.

(56) References Cited

U.S. PATENT DOCUMENTS

| | | | |
|---|---|---|---|
| 2003/0061404 A1 | 3/2003 | Atwal et al. | 709/328 |
| 2005/0102501 A1 | 5/2005 | Haukka et al. | 713/55 |
| 2005/0125661 A1* | 6/2005 | Vaidyanathan | 713/166 |
| 2005/0246548 A1 | 11/2005 | Laitinen | 713/182 |
| 2006/0205387 A1 | 9/2006 | Laitinen | 455/411 |
| 2007/0223703 A1 | 9/2007 | Verma et al. | 380/278 |
| 2009/0037727 A1 | 2/2009 | Pritikin | |
| 2009/0106550 A1* | 4/2009 | Mohamed | 713/156 |
| 2009/0209232 A1 | 8/2009 | Cha et al. | 455/411 |
| 2010/0031355 A1 | 2/2010 | Dik et al. | 726/22 |
| 2010/0165388 A1* | 7/2010 | Ikeura | 358/1.15 |
| 2010/0306854 A1* | 12/2010 | Neergaard | 726/26 |
| 2011/0302627 A1 | 12/2011 | Blom et al. | 726/2 |
| 2012/0027211 A1 | 2/2012 | Lehovirta et al. | 380/255 |

FOREIGN PATENT DOCUMENTS

| | | |
|---|---|---|
| WO | WO 2006/085207 A1 | 8/2006 |
| WO | WO 2010/095988 A1 | 8/2010 |
| WO | WO 2010/114475 A2 | 10/2010 |

OTHER PUBLICATIONS

Google Code. Google Projects for Android: Google APIs. (4 pages) © 2010 Google. http://code.google.com/android/add-ons/google-apis/maps-overview.html.
ClaimID. About ClaimID. Manage your online identity. (2 pages) © 2009 claimID.com, Inc. http://claimid.com/about.
W3C. Cross-Origin Resource Sharing. W3C Working Draft Mar. 17, 2009. (26 pages) http://www.w3.org/TR/2009/WD-cors-20090317/ Editor: Anne van Kesteren. © 2008 W3C®.
W3C. Digital Signatures for Widgets. W3C Working Draft Apr. 15, 2010. (19 pages) http://www.w3.org/TR/2010/WD-widgets-digsig-20100415/ Editors: F. Hirsch, M. Caceres, M. Priestley. © 2010 W3C®.

(Continued)

*Primary Examiner* — Teshome Hailu
(74) *Attorney, Agent, or Firm* — Harrington & Smith

(57) ABSTRACT

A method includes identifying an application installed on a device as an authorized application of a certain domain, the application being signed with a private key; deriving a signer identity using a public key that forms a key pair with the private key; mapping the certain domain to another domain using a deterministic function map; making a request to the another domain to obtain a list of signer identities that are authorized to act on behalf of the certain domain; determining whether the signer of the application is in the list and, if it is, authorizing the application to act with the same privileges as granted in the certain domain. Apparatus and computer programs for performing the method are also disclosed.

27 Claims, 6 Drawing Sheets

(56) References Cited

OTHER PUBLICATIONS

W3C. HTML5 A vocabulary and associated APIs for HTML and XHTML. W3C Working Draft Mar. 4, 2010. (21 pages) http://www.w3.org/TR/2010/WD-html5-20100304/ Editors: Ian Hickson, David Hyatt. © 2010 W3C®.

W3C. Widget Packaging and Configuration. W3C Candidate Recommendation Dec. 1, 2009. (48 pages) http://www.w3.org/TR/2009/CR-widgets-20091201/ Editor: Marcos Caceres. © 2009 W3C®.

3GPP TS 24.109 V9.0.0 (Dec. 2009). Technical Specification Group Core Network and Terminals; Bootstrapping interface (Ub) and network application function interface (Ua); Protocol details (Release 9). (70 pages) © 2009, 3GPP Organizational Partners.

3GPP TS 33.220 V9.2.0 (Dec. 2009). Technical Specification Group Services and System Aspects; Generic Authentication Architecture (GAA); Generic bootstrapping architecture (Release 9). (75 pages) © 2009, 3GPP Organizational Partners.

3GPP TR 33.980 V9.0.0 (Dec. 2009), 3rd Generation Partnership Project; Technical Specification Group Services and System Aspects; Liberty Alliance and 3GPP Security Interworking; Interworking of Liberty Alliance Identity Federation Framework (ID-FF), Identity Web Services Framework (ID-WSF) and Generic Authentication Architecture (GAA) (Release 9), (39 pages).

Zhang, et al., "Securing Elastic Applications on Mobile Devices for Cloud Computing", (Nov. 2009), (8 pages).

Android Developers. Signing Your Applications. (9 pages) http://developer.android.com/guide/publishing/app-signing.html; 2010.

Forum.Nokia.com. Web Runtime Widgets. (4 pages) http://www.forum.nokia.com/Technology_Topics/Web_Technologies/Web_Runtime/ ; 2010.

* cited by examiner

METHOD AND APPARATUS TO BIND A KEY TO A NAMESPACE

TECHNICAL FIELD

The exemplary and non-limiting embodiments of this invention relate generally to wireless communication systems, methods, devices and computer programs and, more specifically, relate to protocols and security procedures to prove that a resource, such as a Web application, is authorized to act on behalf of, or be identified as, another resource, such as a Web domain.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:
AKA authentication and key agreement
API application program interface
AUTN authentication token
AV authentication vector
BSF bootstrapping server function
B-TID boostrapping transaction identifier
CA certification authority
CK cipher key
DNS domain name server
FQDN fully qualified domain name
GBA generic bootstrapping architecture
GBA_U GBA with UICC-based enhancements
GUSS GBA user security settings
HLR home location register
HSS home subscriber system
HTTP hypertext transfer protocol
HTTPS hypertext transfer protocol secure
IK integrity key
IMPI IMS private user identity
IMS IP multimedia subsystem
IP internet protocol
Ks_ext_NAF derived key in GBA_U
NAF network application function
NAF_ID network application function identifier
RAND random challenge
TLS transport layer security
TMPI temporary IMPI
UE user equipment
UICC universal integrated circuit card
URI uniform resource identifier
URL uniform resource locator
XRES expected response One specification of interest herein is 3GPP TS 33.220 V9.2.0 (2009-12) Technical Specification 3rd Generation Partnership Project; Technical Specification Group Services and System Aspects; Generic Authentication Architecture (GAA); Generic bootstrapping architecture (Release 9), referred to hereafter for convenience as 3GPP TS 33.220. FIG. 1 herein reproduces FIG. 4.1 of 3GPP TS 33.220, "Simple network model for bootstrapping involving HSS with a reference point", while FIG. 2 herein reproduces FIG. 4.3 of 3GPP TS 33.220, "The bootstrapping procedure".

FIG. 1 shows the simple network model of the entities involved in the bootstrapping approach when a HSS with Zn reference point is deployed, and the various reference points (e.g., the interfaces Ub, Ua, Zn, Dz) used between them.

When the UE wants to interact with a NAF, and it knows that the bootstrapping procedure is needed, it first performs bootstrapping authentication as shown in FIG. 2, otherwise, the UE performs bootstrapping authentication only when it has received a bootstrapping initiation required message or a bootstrapping negotiation indication from the NAF, or when the lifetime of a key in the UE has expired.

The UE always includes the product token "3gpp-gba-tmpi" in a user agent request-header field when communicating over Ub. The BSF always includes the product token "3gpp-gba-tmpi" in the server response-header field when communicating over Ub.

The following steps are performed in the basic bootstrapping procedure shown in FIG. 2.

(1) The UE sends an HTTP request towards the BSF. When a TMPI associated with the IMPI in use is available on the UE, the UE includes this TMPI in the "username" parameter, otherwise the UE includes the IMPI.

(2) The BSF recognizes from the structure of the "username" parameter whether a TMPI or an IMPI was sent. If a TMPI was sent the BSF looks up the corresponding IMPI in its local database. If the BSF does not find an IMPI corresponding to the received TMPI it returns an appropriate error message to the UE. The UE then deletes the TMPI and retries the request using the IMPI.

The BSF retrieves the complete set of GBA user security settings and one Authentication Vector (AV, AV=RAND|AUTN|XRES|CK|IK) over the reference point Zh from the HSS (where indicates concatenation).

In the case that no HSS with the Zh reference point is deployed, the BSF retrieves the Authentication Vector over a reference point Zh' from either an HLR or an HSS with Zh' reference point support. The Zh' reference point is defined to be used between the BSF and the HLR, and allows the BSF to fetch required authentication information (see 3GPP TS 33.220, clause 4.3.6 and clause 4.4.12).

If the BSF implements a timestamp option and has a local copy of the 'for the subscriber that has been fetched from the HSS during a previous bootstrapping procedure, and this GUSS includes a timestamp, the BSF may include the GUSS timestamp in the request message. Upon receiving that timestamp, if the HSS implements the timestamp option, the HSS may compare it with the timestamp of the GUSS stored in the HSS. In this case, if and only if the HSS has done the comparison and the timestamps are equal, then the HSS sends a "GUSS TIMESTAMP EQUAL" indication to the BSF. In any other case, the HSS sends the GUSS (if available) to the BSF. If the BSF receives "GUSS TIMESTAMP EQUAL" indication, it keeps the local copy of the GUSS. In any other case, the BSF deletes the local copy of the GUSS and stores the received GUSS (if sent).

(3) The BSF forwards the RAND and AUTN to the UE in a 401 message (without the CK, IK and XRES). This is to demand the UE to authenticate itself.

(4) The UE checks the AUTN to verify that the challenge is from an authorized network; the UE also calculates CK, IK and RES. This will result in session keys IK and CK in both the BSF and the UE.

(5) The UE sends another HTTP request, containing the Digest AKA response (calculated using RES), to the BSF.

(6) The BSF authenticates the UE by verifying the Digest AKA response.

(7) The BSF generates key material Ks by concatenating CK and IK. The B-TID value is also generated in format of NM by taking the base64 encoded RAND value from step (3), and the BSF server name, i.e.:
base64encode(RAND)@BSF_servers_domain_name.

If the request included the product token "3gpp-gba-tmpi" in the user agent request-header field the BSF computes a new TMPI stores it together with the IMPI, overwriting a previous TMPI related to this IMPI, if any.

(8) The BSF sends a 200 OK message, including a B-TID, to the UE to indicate the success of the authentication. In addition, in the 200 OK message, the BSF supplies the lifetime of the key Ks. The key material Ks is generated in UE by concatenating CK and IK.

(9) Both the UE and the BSF use the Ks to derive the key material Ks_NAF during the procedures as specified in clauseC4.5.3. Ks_NAF is used for securing the reference point Ua.

To allow consistent key derivation based on the NAF name in the UE and the BSF, at least one of the three following prerequisites has to be fulfilled:

(a) The NAF is known in a DNS under one domain name (FQDN) only, i.e., no two different domain names point to the IP address of the NAF. This is achieved by administrative means.

(b) Each DNS entry of the NAF points to a different IP address. The NAF responds to all of these IP addresses. Each IP address is tied to the corresponding FQDN by NAF configuration. The NAF can determine from the IP address which FQDN to use for key derivation.

(c) The Ua uses a protocol which transfers the host name (FQDN of NAF as used by the UE) to the NAF (e.g. HTTP/1.1 with mandatory Host request header field). This requires the NAF to check the validity of the host name, and to use this name in all communication with the UE where appropriate, and to transfer this name to the BSF to allow for correct derivation of Ks_NAF.

The UE and the BSF store the key Ks with the associated B-TID for further use, until the lifetime of Ks has expired, or until the key Ks is updated, or until deletion conditions are satisfied.

An existing problem relates to the fact that with current standards it is not possible for a signed Web application (widget) to prove a mapping that it is allowed to act on behalf of a namespace or be identified as a certain namespace. Thus, such a widget has typically more limited access to local system resources that does a widget that has been signed by a certified application vendor.

SUMMARY

The foregoing and other problems are overcome, and other advantages are realized, in accordance with the exemplary embodiments of this invention.

In accordance with an aspect of the exemplary embodiments of this invention a method includes identifying an application installed on a device as an authorized application of a certain domain, the application being signed with a private key; deriving a signer identity using a public key that forms a key pair with the private key; mapping the certain domain to another domain; making a request to the another domain to obtain a list of signer identities that are authorized to act on behalf of the certain domain; determining whether the signer of the application is in the list and, if it is, authorizing the application to act with the same privileges as granted in the certain domain.

Further in accordance with an aspect of the exemplary embodiments of this invention an apparatus comprises a processor and a memory including computer program code. The memory and computer program code are configured to, with the processor, cause the apparatus at least to, identify an application installed on a device as an authorized application of a certain domain, the application being signed with a private key; derive a signer identity using a public key that forms a key pair with the private key; map the certain domain to another domain; make a request to the another domain to obtain a list of signer identities that are authorized to act on behalf of the certain domain; determine whether the signer of the application is in the list and, if it is, authorize the application to act with the same privileges as granted in the certain domain.

BRIEF DESCRIPTION OF THE DRAWINGS

The foregoing and other aspects of the exemplary embodiments of this invention are made more evident in the following Detailed Description, when read in conjunction with the attached Drawing Figures, wherein.

DETAILED DESCRIPTION

It is noted that JAVA and JAVASCRIPT are registered trademarks of Sun Microsystems Incorporated. GOOGLE and ANDROID are registered trademarks of Google Inc. FACEBOOK is an applied for service mark of Facebook, Inc.

A "namespace" can be considered to be an abstract container that provides context for items contained in the namespace.

As employed herein a "widget" refers to an application that has a need to bind itself to a namespace. The exemplary embodiments of this invention are concerned with all types of applications including, but not limited to, Web applications and widgets.

One major difference between a Web application (widget) and a Web page is that a widget is typically installed on the device and executed locally on the device. The Web page on the other hand is downloaded to the device from a Web server, and then executed locally on the device. In the former case, the widget typically executes in a Web Runtime, or similar environment, and the latter in a Web browser.

In accordance with the exemplary embodiments of this invention there is provided a technique to provide an "origin"

for a widget. After the widget obtains a verified origin, normal browser principles can come into play and existing specifications can be used.

It is known from Google Android that there can be self-signed namespace/identities where the mobile device internal sandbox system is based on self-generated keys (but URL binding is not performed.

It is known from Google Maps that the API binds an API_key to a self-generated application certificate, but in this case it is the Google Maps server that performs the checking between the "Referrer" and the API_key.

ClaimID provides a service where an end user can "claim" a web page on the Internet by proving that the user has access to the web page. This is implemented by the Claimid server instructing the end user to add a certain identifier to the user's web page, and then the server checks that the identifier is present.

W3C Digital Signatures for Widgets defines how widgets are signed.

W3C Cross-Origin Resource Sharing is used in HTML5 to authorize Web pages to make Javascript calls to other domains/URLs. However, this technique does not apply to widgets.

Figure 6:
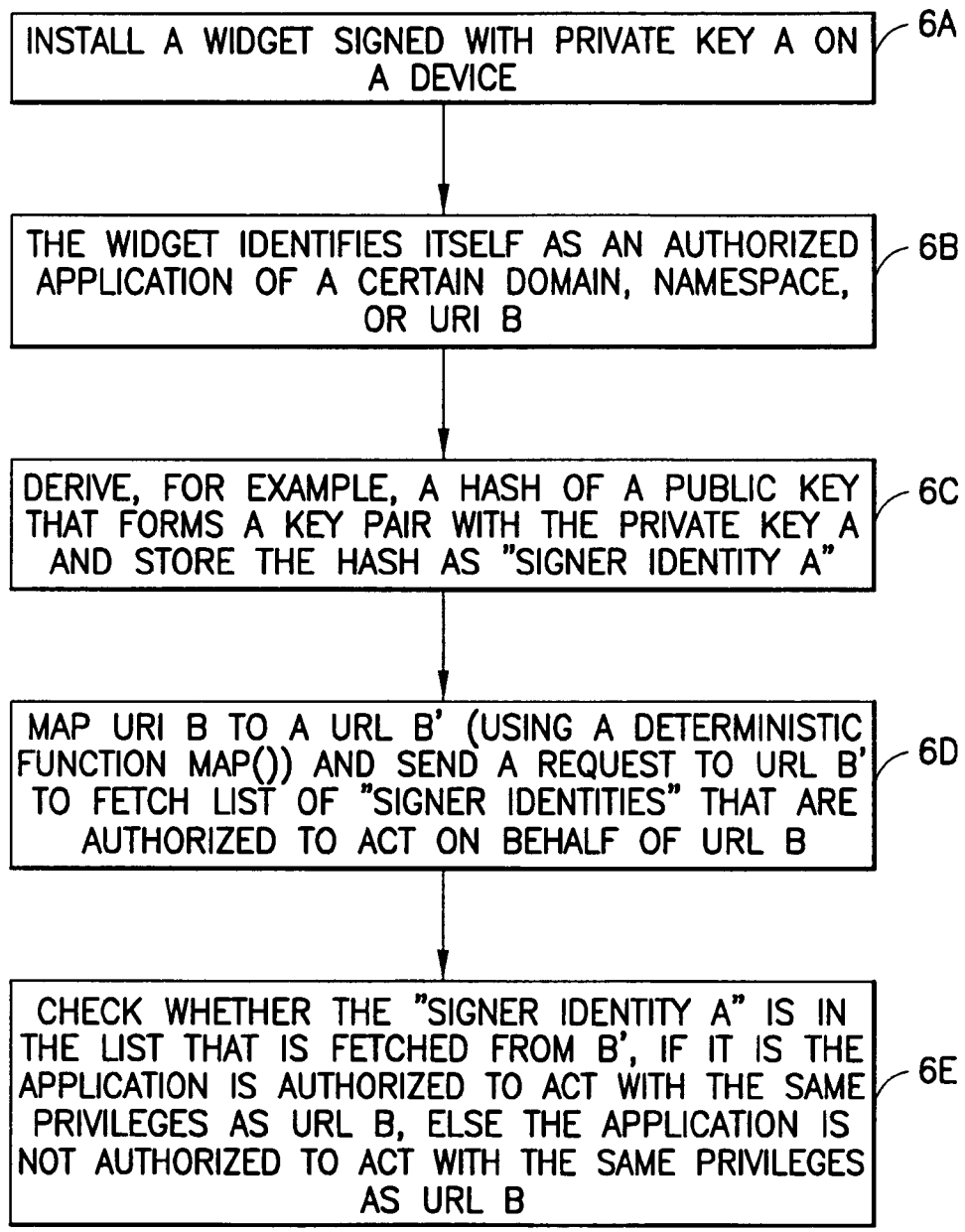
FIGS. 6 and 7 are each a logic flow diagram that illustrate the operation of a method, and a result of execution of computer program instructions, further in accordance with the exemplary embodiments of this invention.

FIG. 6 is a logic flow diagram that illustrates the operation of a method, and a result of execution of computer program instructions, in accordance with the exemplary embodiments of this invention. In accordance with these exemplary embodiments a method performs, at Block 6A, installing a signed widget on a device (e.g., on the UE 10). The widget is signed with a private key A (or with public key cryptography).

At Block 6B the widget identifies itself as an authorized application of a certain domain, namespace, or URI B.

At Block 6C the device derives a hash of a public key that forms a key pair with the private key A and stores it as "signer identity A". Alternatively, the device can use the key directly, or it can use a hash of a public key certificate, or it can use the public key certificate directly.

At Block 6D the device maps the URI B to a URL B', such as by using a deterministic function map( ), and makes a request to URL B' in order to fetch a list of "signer identities" that are authorized to act on behalf of B. As employed herein a deterministic function implies that the function returns the same result each time the function is called with a specific set of input values.

For example, if URI B would be 'com.bar.foo.application1' the map may return 'https://foo.bar.com/auth.1st', or if URI B would be 'www.foo.bar.com#application1' another map may return 'https://foo.bar.com/auth.1st'. From the point of view of the exemplary embodiments the exact details of the mapping are not important, so long as the mapping exhibits at least the following properties: 1) the mapping is publicly known, 2) the mapping is deterministic, and 3) the mapping produces a URL that can be used to fetch the identity list. An additional, optional property is that the map( ) makes facilitates a human determining the domain part of URL B' from URI B.

At Block 6E the device checks whether the "signer identity A" is in the list that is fetched from B'. If it is, the application is authorized to act with the same privileges as B, otherwise the application is not authorized to act with the same privileges as B.

In this manner the signed widget is able to claim ownership of a namespace, domain, or URL, and thus this aspect of the exemplary embodiments provides a technique to map a widget to a domain.

Whether the widget is self-signed or signed by a certified code signing key is not relevant to the operation of the exemplary embodiments. Thus, while the ensuing description refers to the self-signed case only for the sake of simplicity, it should be kept in mind that the widget could also be signed by a certified code signing key.

Note that the W3C Cross-Origin Resource Sharing specification can be used such that the "Origin" header would contain the "signer identity" of the widget, and the server sends back the access rights allowable for the particular widget. This is different in the sense that the widget identity (signer identity) is sent to the server, and the server replies with either an ACK or NACK to the request.

This aspect of the exemplary embodiments assumes that a sufficiently long key pair is generated so that is statically globally unique without central name/ID authority. Thus, it can be assumed that the self-signed certificate is unique within some high probability (sufficiently unique for the needed purpose).

As a first example, in a key generation step assume that some third party generates a key pair (this can be performed once per third party).

In a develop step a self-signed widget is developed by a third party that signs the widget with a private key. The third party includes a self-signed certificate within the widget installation package. The self-signed certificate contains the corresponding public key and is signed by the private key. The widget also identifies itself as an authorized application of a domain or a URL. This information can be embedded in the widget installation package, or it can be part of the self-signed certificate (e.g., the common name of the distinguished name), or it can be dynamically requested during runtime.

In a distribution step the third party either controls a domain/URL on its own, or has an agreement with another party that controls the domain/URL that was identified in the previous step. The public key identified in the previous step is then either used directly or is hashed with an appropriate hash function to form an identifier. This identifier is added into a predefined resource in the domain/URL in question. In the domain case (any.domain.com) this can be retrieved from URL: http://any.domain.com/auth.1st or alternatively in the URL (http://any.domain.com/service1/startwiththis.html), or this could be retrieved from URL: http://any.domain.com/service1/auth.1st. In any case, when an entity would retrieve one of these resources, the "auth.1st" would contain all the authorized identifiers.

In an installation step, and when an end user installs the self-signed widget, it will first check that signature of the widget is correct and that the self-signed widget is correct. It then constructs the identifier in the same way as was done in the distribution step and associates the widget with the constructed identifier. It also checks whether the widget claims a resource in the widget installation package and, if it does, it validates the claim by fetching the identifier list from the corresponding domain and URL resources (auth.1st) and checks whether the identifier is present in the resource. If it is, the claim is granted. If not the claim is not granted. Note that the claim can be verified also during runtime.

In a runtime step, and when the end user uses the widget, the device grants usage rights to the widget based on the claim(s) obtained earlier. The device can also re-validate the existing claim(s) by fetching the resource auth.1st once again. This technique can be used to revoke the rights of the widget. The device can also validate dynamic claims where the widget claims resources dynamically during runtime.

Note that the device can check that the widget has not been modified since installation, or that the widget is modified only by a resource claimed by the widget. For example, only the widget developer can modify the widget, and any modification attempted to the widget by another party should be blocked.

With respect to the life cycle of resource claims, it is the responsibility of the device to implement a policy of how the life cycle of resource claims are managed. As one example, all of the resource claims can be validated each time the widget starts, or each time a resource is used, or periodically (e.g., every 24 hours), or the expiration can be stated by the "Expires" HTTP Header, as several non-limiting examples. Thus, the server can control the lifetime dynamically.

The resource lists can additionally provide more fine grained access control to the widget. For example, the resource list can indicate read access, write access, and/or execute access for a resource (e.g., network location, contacts). Further by example, the resource list can indicate a limited accuracy of measurement (e.g., location, temperature).

In general, the application can be any signed or uniquely identifiable application.

As another example, the above-described self-signed widget can be authorized to use a certain NAF_ID (=URL) to generate GBA keys.

Figure 1:
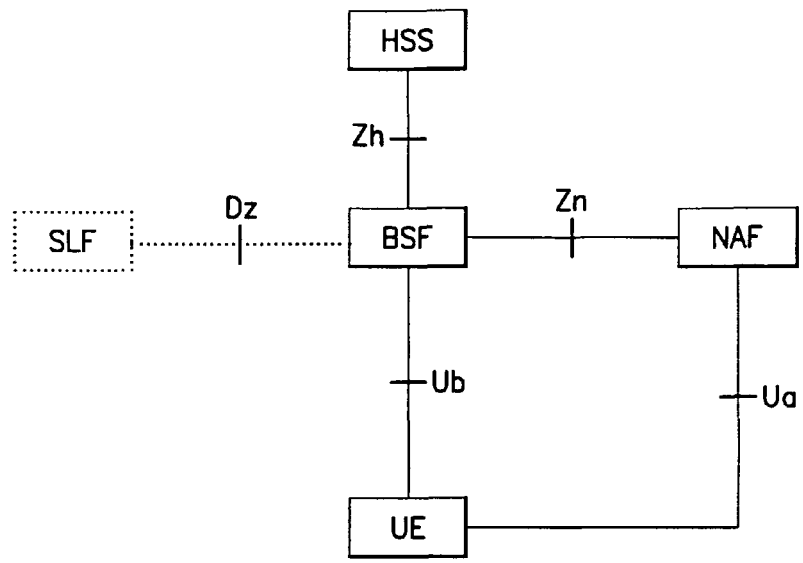
FIG. 1 reproduces FIG. 4.1 of 3GPP TS 33.220, "Simple network model for bootstrapping involving HSS with Zh reference point".
Figure 3:
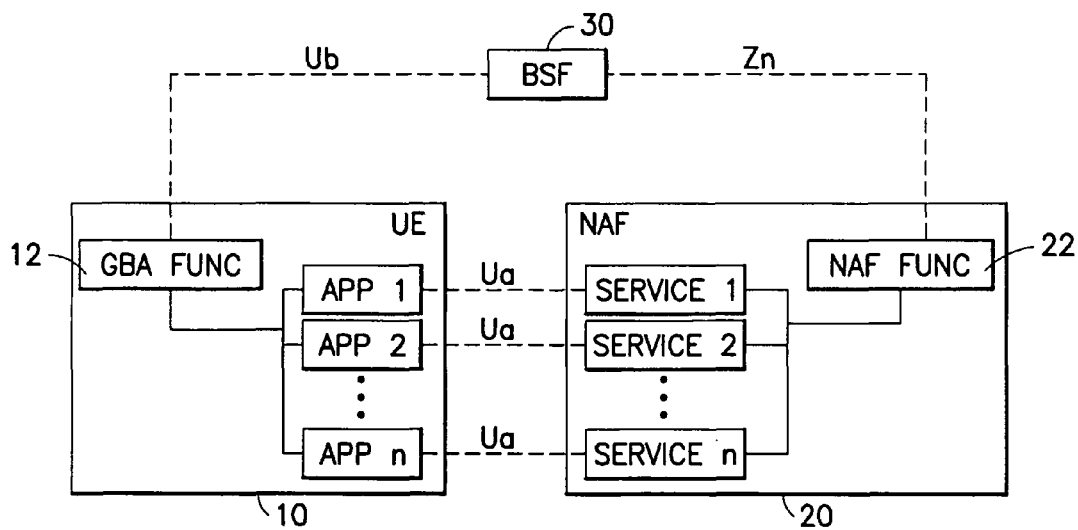
FIG. 3 shows an example of an architecture of a multi-service provider NAF.
Figure 2:
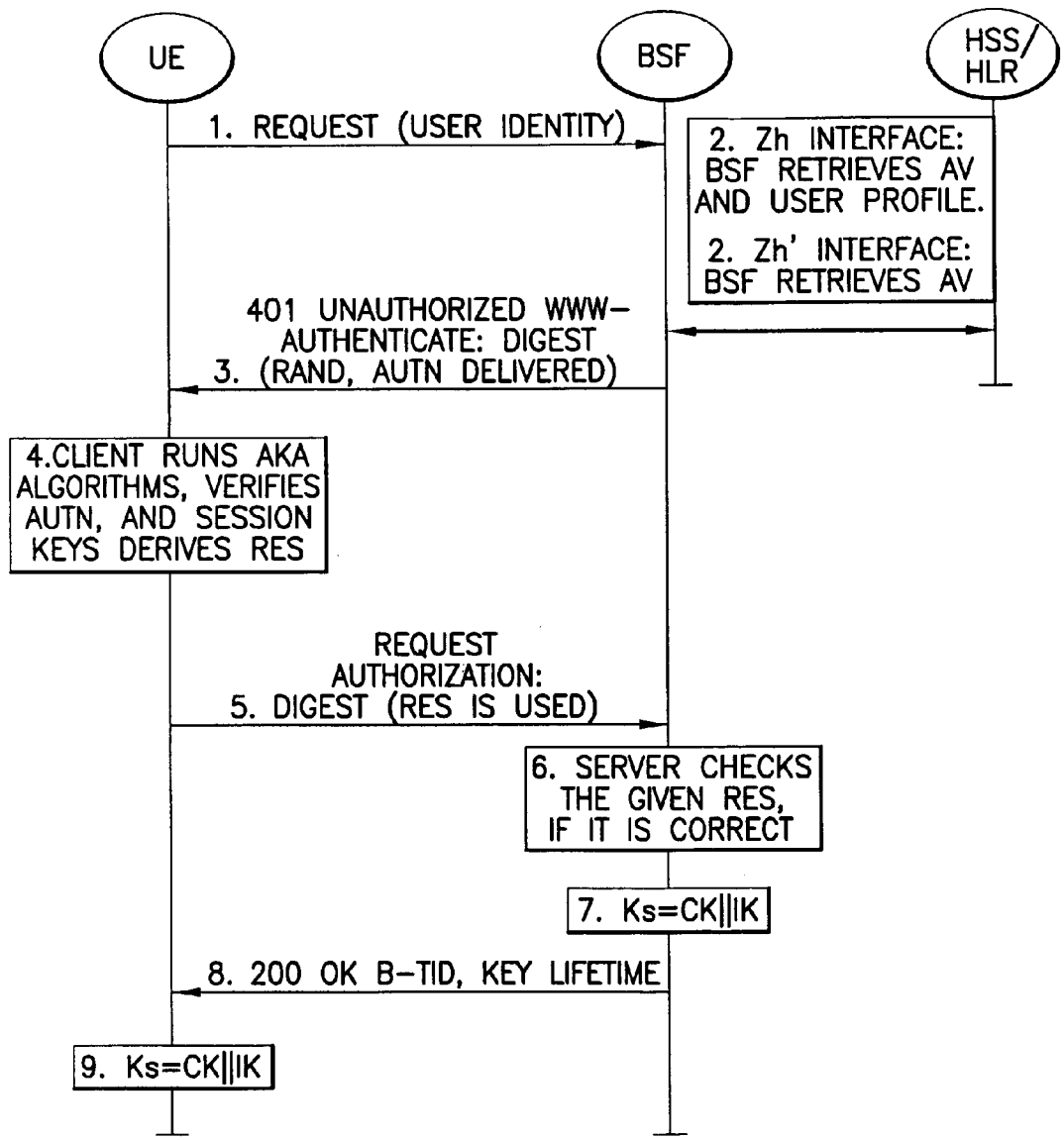
FIG. 2 reproduces FIG. 4.3 of 3GPP TS 33.220, "The bootstrapping procedure".

Discussed briefly now is the concept of NAF_ID authorization in the NAF. Reference is made to FIG. 3, which shows a UE 10, a NAF 20 and a BSF 30, and which illustrates a situation where the NAF 20 is hosting multiple services (service_1, service_2, . . . , service_n that are operated by different parties. In this example the NAF 20 is running a single server platform that needs to enforce access control when the services are requesting GBA keys. The NAF 20 is assumed to include a NAF function 22, and the UE 10 is assumed to include a GBA function 12.

Discussed now is the URL authorization with respect to the Web application case.

In the Web application case the application is installed on the device (e.g., on the UE 10) and thus there is no default mechanism similar to the Web page case to handle the URL authorization (as the application is running locally on the UE 10). Thus, a mechanism is needed to perform the URL authorization.

As was indicated above, the Web application can be digitally signed. In this case the signer of the Web application may either have a signing key that has been certified by a certification authority (CA), i.e., the signer has a valid certificate from the CA, or the signing key is accompanied by a self-signed certificate. A plurality of trust levels can be established, e.g., three trust levels, for Web applications and depending on the trust level, the Web application may have access to one or more GBA keys associated with an URL.

Trust level 2: The Web application is digitally signed, and the signer has a certificate from a CA. Additionally, either the CA itself, or the signer, has been designated as "trusted" in the UE 10. In this case the Web application has full access to GBA keys, i.e., it can request any GBA key in the Web application context. That is, the Web application Ua security protocol identifier is always used. This type of Web application can typically be offered by either the mobile network operator or by the device vendor.

Trust level 1: The Web application is digitally signed, and the signer has either a certificate from a CA, or the signer has a self-signed certificate, and neither of the signer or the CA has been designated as "trusted" in the UE 10. In this case the UE 10 controls access to the GBA keys. When a Web application with trust level 1 is accessing a GBA key the UE 10 validates the request by making a request to the server identified by the URL, and then checking whether the corresponding Web application is authorized to obtain the GBA key in question. If the access is granted the GBA key is given to the Web application. This can be one time grant, where each time the Web application requests access to the GBA key the UE 10 validates the request with the server, or it can be a blanket grant, where any subsequent GBA key requests are granted automatically. This process is described in further detail below. This type of Web application can typically be offered by third parties who also operate a third party NAF (i.e., the server that is being accessed) that have an agreement with the mobile network operator.

Trust level 0: The Web application is not digitally signed. In this case the Web application is not given access to GBA keys.

Note that the URL trimming described above can also be used by the Web applications, as they may additionally need to generate more generic GBA keys.

Figure 5:
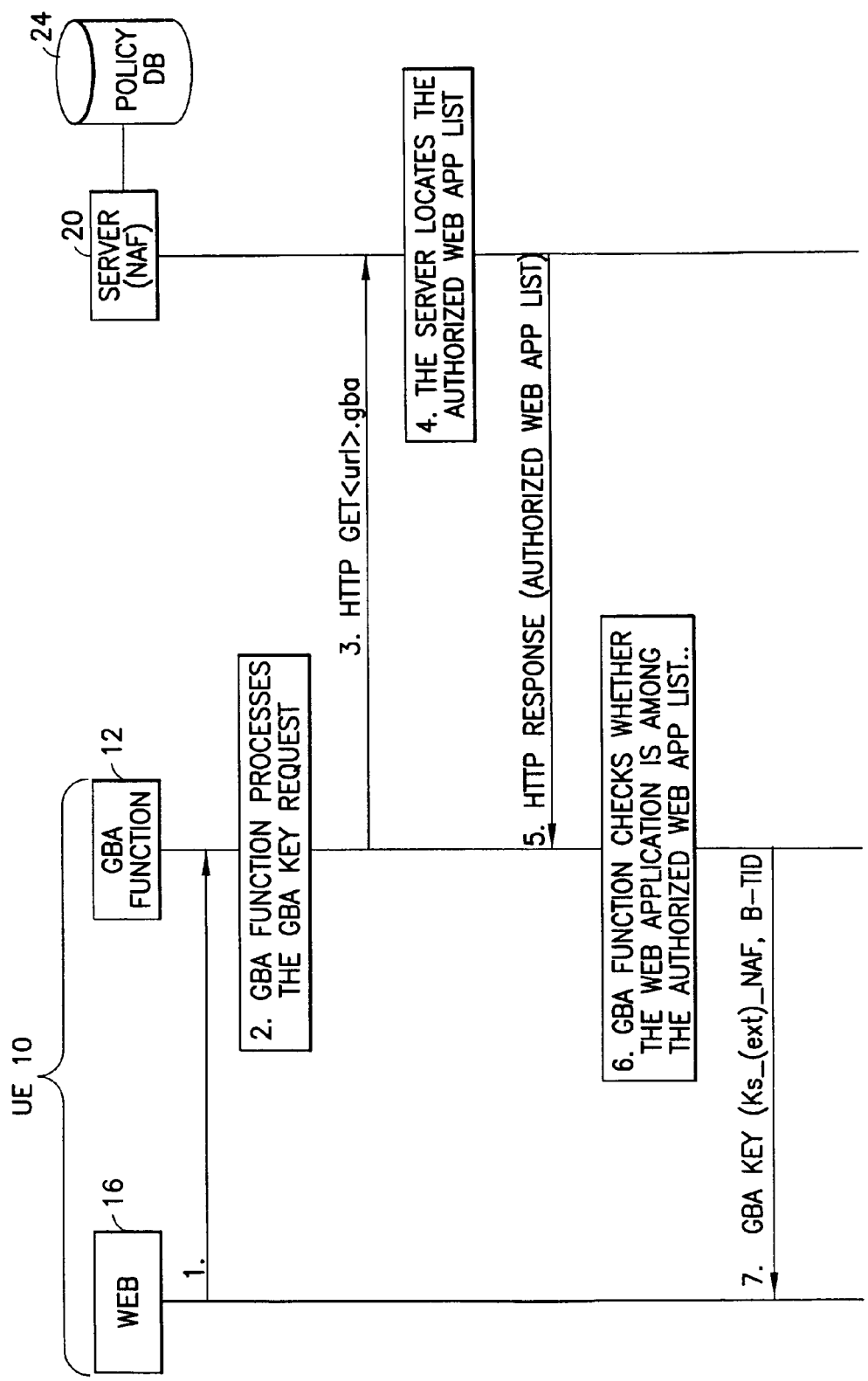
FIG. 5 depicts an exemplary sequence flow for GBA access from a Web application (widget).

FIG. 5 shows a sequence flow example depicting a procedure for the UE 10 to validate a Web application request for GBA keys.

The exemplary sequence flow is as follows.

1. A Web application 16 (e.g., a widget) is executing Javascript and reaches a point where a GBA key needs to be obtained from the platform services. The Web application 16 makes a request to the platform service indicating the URL for which it needs the GBA key. The platform application is assumed to include the GBA function 12.

2. The GBA function 12 receives the request for the Web application-based GBA key. The GBA function 12 first checks whether the web application is allowed to gain access to the particular GBA key. In this example the GBA function 12 discovers that the Web application is associated with the above-described trust level 2, and authorization is needed from the server 20.

3. The GBA function 12 makes a HTTP GET request to the URL what was provided by the Web application. The GBA function 12 appends to the URL a postfix ".gba" to indicate to the server 20 that this is a request for a list of authorized Web applications that are allowed to obtain the GBA key for this particular URL.

4. The server (NAF) 20 receives the request for the authorized Web applications list. The server 20 processes the request and obtains the authorized Web applications list from, for example, a policy database (DB) 24 associated with the server 20. The authorized Web applications list contains, for example, hashes of public keys.

5. The server (NAF) 20 returns the list of public key hashes Authorized Web applications list) to the GBA function 12 of the UE 10.

6. The GBA function 12 checks the list of public key hashes against the Web application signer's public key. If the signer's public key hash is found in the authorized Web applications list the GBA function 12 allows access to the GBA key and derives the key as follows: $Ks\_(ext)\_NAF=KDF(Ks, \text{"gba-me"}, RAND, IMPI, NAF\_Id)$, where the NAF_Id is the URL concatenated with a new Ua security protocol identifier for the Web application context.

7. The derived GBA key with the B-TID are returned to the Web application 16. How the Web application 16 actually uses the GBA key with the server (NAF) 20 is Web application specific, and can take a number of different forms.

It should be noted that a number of modifications may be made to the exemplary session flow described above with respect to FIG. 5. For example, in step 3 the GBA function 12 can send the hash of the signer's public key to the server (NAF) 20, and the server 20 itself can check whether the signer is authorized to gain access to the GBA key. The server then returns, e.g., a "true" or "false" indication in step 5 depending on the result of the check.

Further by example, in step 6 the GBA function 12 can designate the signer as "trusted" in the UE 10 if the access to the GBA key was granted. The next time the same Web application 16 makes a request for the GBA key of the same URL, the GBA function 12 can then immediately derive and return the GBA key, thereby skipping the execution of steps 3-5.

On technical effect that is realized is an ability to dynamically authorize applications on the device.

Another technical effect is that certificate revocation is not needed.

Based on the foregoing it should be apparent that the exemplary embodiments of this invention provide a method, apparatus and computer program(s) to enhance the operation of the GBA.

Figure 7:
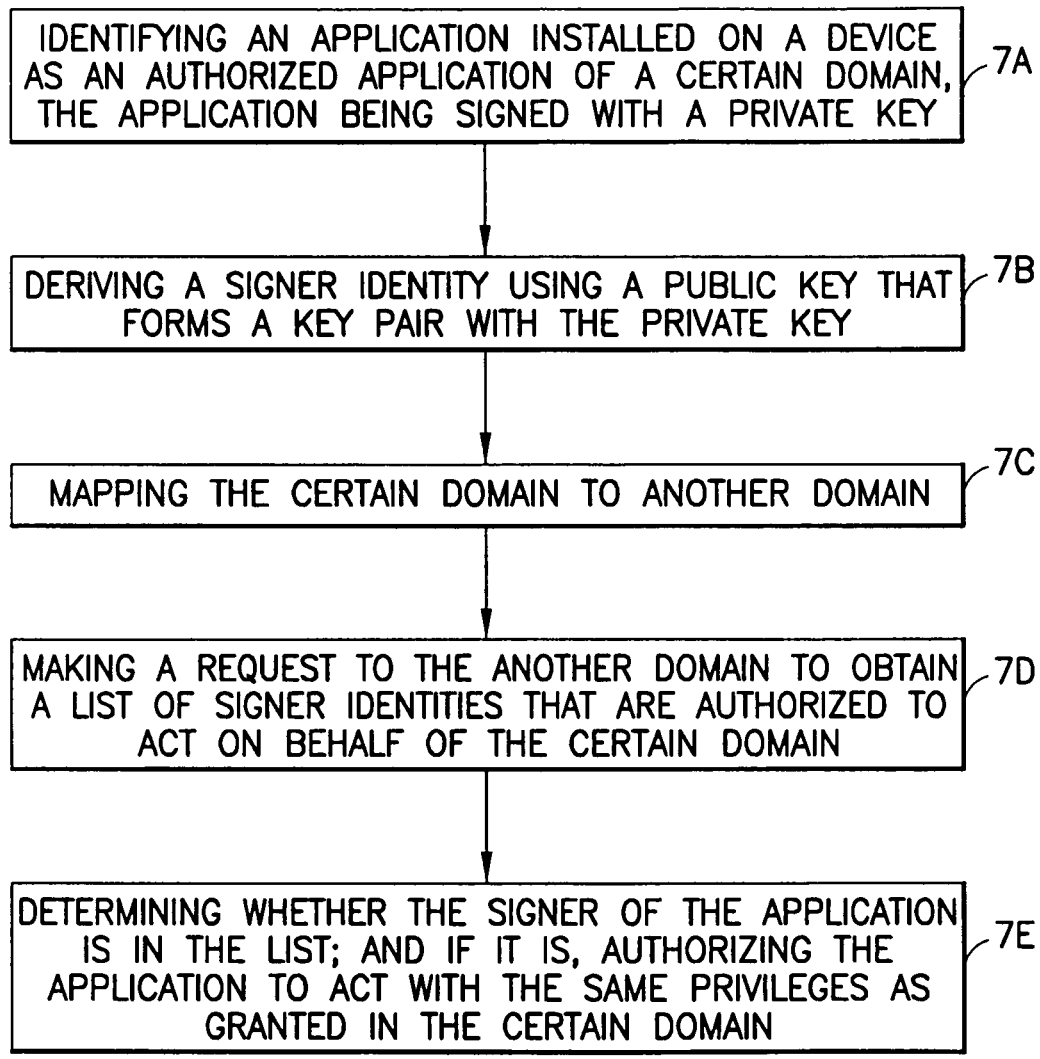

FIG. 7 is a logic flow diagram that illustrates the operation of a method, and a result of execution of computer program instructions, further in accordance with the exemplary embodiments of this invention. In accordance with these exemplary embodiments a method performs, at Block 7A, a step of identifying an application installed on a device as an authorized application of a certain domain, the application being signed with a private key. At Block 7B there is a step of deriving a signer identity using a public key that forms a key pair with the private key. At Block 7C there is a step of mapping the certain domain to another domain. At Block 7D there is a step of making a request to the another domain to obtain a list of signer identities that are authorized to act on behalf of the certain domain. At Block 7E there is a step of determining whether the signer of the application is in the list; and if it is, authorizing the application to act with the same privileges as granted in the certain domain.

The various blocks shown in FIGS. 6 and 7 may be viewed as method steps, and/or as operations that result from operation of computer program code, and/or as a plurality of coupled logic circuit elements constructed to carry out the associated function(s).

Figure 4:
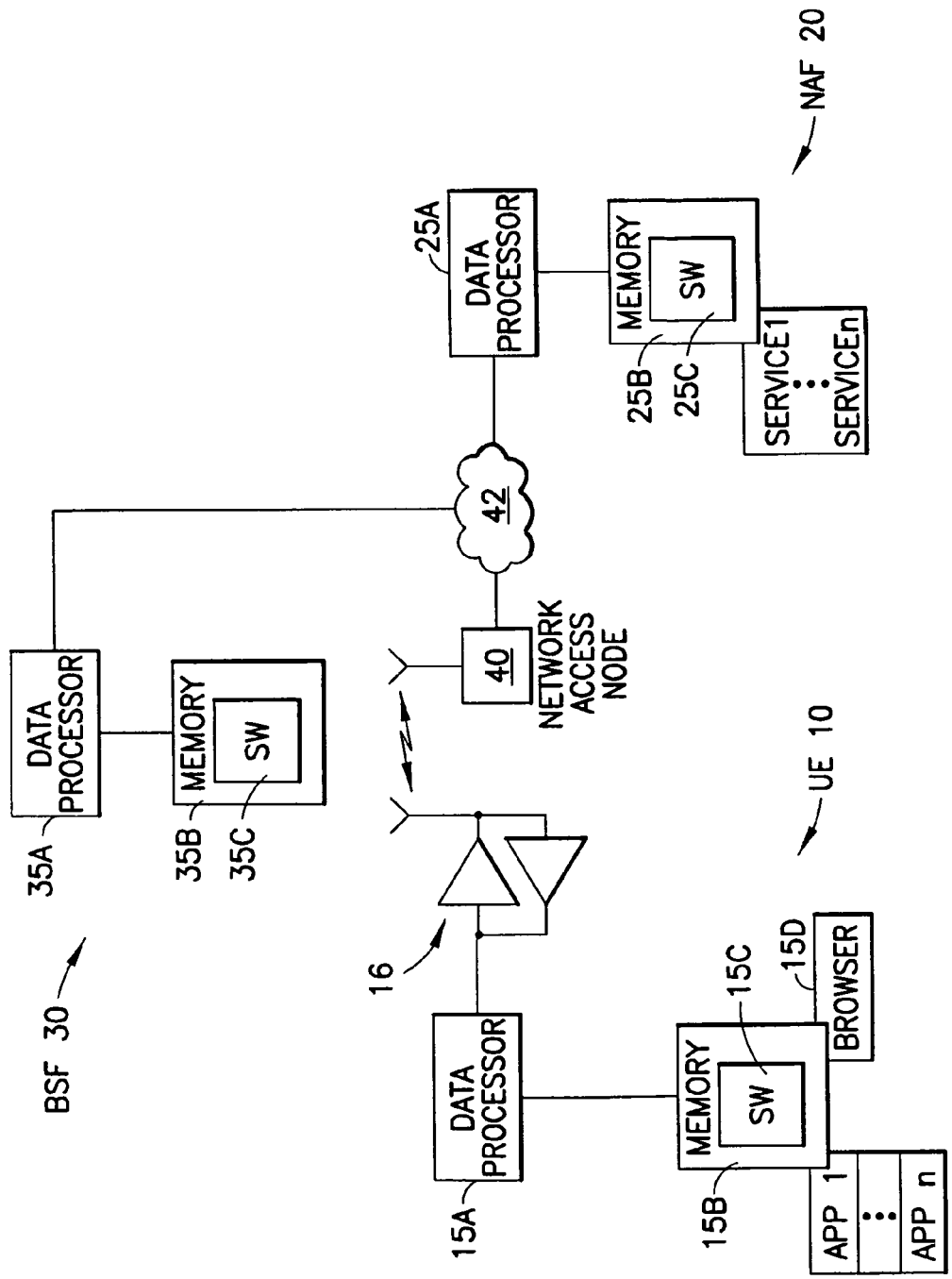
FIG. 4 illustrates a simplified block diagram of apparatus that are suitable for implementing the exemplary embodiments of the invention.

Further in this regard reference can be made to FIG. 4 for illustrating a simplified block diagram of apparatus that are suitable for implementing the exemplary embodiments of the invention described above. In general, the UE 10 can include at least one data processor 15A connected with at least one memory 15B storing software (SW) 15C that is configured to execute methods and procedures in accordance with aspects of the exemplary embodiments described above. In certain embodiments the SW 15C can include the functionality of the GBA function 12 shown in FIG. 3. The memory 15B can also store SW implementing various Web applications (app_1, app_2, ..., app_n) and possibly also SW implementing a Web browser 15D. For the case of the UE 10 being a wireless device there is also provided at least one wireless transceiver (e.g., a radio frequency or an optical transceiver) configured to provide wireless connectivity with a network access node 40, such as a base station. The UE 10 is connected via the network access node 40 and a network 42 to the NAF 20 and the BSF 30, which in turn are connected with one another through the same or a different network. The NAF 20 can include at least one data processor 25A connected with at least one memory 25B storing SW 25C that is configured to execute methods and procedures in accordance with aspects of the exemplary embodiments described above, including the functionality of the NAF function 22 shown in FIG. 3. The SW 25C can also be assumed to generally fulfill the requirements of the overall NAF functionality described in, for example, 3GPP TS 33.220. The memory 25B can also store SW implementing the various services (service_1, service_2, ..., service_n). The BSF 30 can include at least one data processor 35A connected with at least one memory 35B storing SW 3C that is configured to execute methods and procedures in accordance with aspects of the exemplary embodiments described above, and to generally fulfill the requirements of the overall BSF functionality described in, for example, 3GPP TS 33.220.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

A further aspect of these exemplary embodiments is an apparatus that comprises means for identifying an application installed on a device as an authorized application of a certain domain, where the application is signed with a private key. The apparatus further comprises means for deriving a signer identity using a public key that forms a key pair with the private key, means for mapping the certain domain to another domain, and means for making a request to the another domain to obtain a list of signer identities that are authorized to act on behalf of the certain domain. The apparatus further comprises means for determining whether the signer of the application is in the list; and if it is, authorizing the application to act with the same privileges as granted in the certain domain.

It should be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

As was made apparent above, various modifications and adaptations to the foregoing exemplary embodiments of this invention may be made, and others may become apparent to those skilled in the relevant arts in view of the foregoing description, when read in conjunction with the accompanying drawings. However, any and all modifications will still fall within the scope of the non-limiting and exemplary embodiments of this invention.

It should be appreciated that the exemplary embodiments of this invention are not limited for use with any one particular type of wireless communication system, and that they may be used to advantage in a number of different wireless communication systems, including both cellular and non-cellular wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
    identifying an application installed on a device as an authorized application of a certain domain, where the certain domain is associated with a uniform resource identifier (URI), the application being signed with a private key;
    deriving a signer identity using a public key that forms a key pair with the private key;
    mapping the certain domain to another domain, where the another domain is associated with a uniform resource locator (URL);
    making a request to the another domain using the uniform resource locator (URL) to obtain a list of signer identities that are authorized to act on behalf of the certain domain;
    determining whether the signer of the application is in the list; and
    if it is, authorizing the application to act with the same privileges as granted in the certain domain.

2. The method of claim 1, where the application is one of self-signed or signed by a certificate authority.

3. The method of claim 1, where the request is made when the application makes a claim to a resource.

4. The method of claim 1, where the request is made each time the application starts, or each time a resource is used, or periodically.

5. The method of claim 1, where a life time of the authorization is explicitly specified.

6. The method of claim 3, where the resource is specified as part of a uniform resource locator sent to a network application function, where the uniform resource locator identifies the network application function.

7. The method of claim 1, where mapping comprises using a deterministic function.

8. The method of claim 1, where deriving the signer identity comprises one of using a hash of the public key, or using the public key directly, or using a hash of a public key certificate, or using the public key certificate directly.

9. The method as in claim 1, where an installation package of the application includes a self-signed certificate comprising the public key, where the self-signed certificate is signed with a private key forming a key pair with the public key.

10. The method as in claim 1, where the application is authorized to use a certain network application function identifier, embodied as a certain uniform resource locator, to generate a generic bootstrapping architecture key.

11. The method as in claim 1, where in response to a request to generate a generic bootstrapping architecture key a hash of the public key is sent from a generic bootstrapping architecture server to a network application function server, where the network application function server determines whether a signer of the application is authorized to gain access to the generic bootstrapping architecture key, and where the network application function server returns an indication depending on a result of the determination to the generic bootstrapping architecture server.

12. The method as in claim 11, further comprising the generic bootstrapping architecture server designating the signer of the application as trusted if access to the generic bootstrapping architecture key is authorized so that upon occurrence of a subsequent request the generic bootstrapping architecture server can derive and return the generic bootstrapping architecture key without first sending the hash of the public key to the network application function server.

13. The method as in claim 1, where making a request and determining are performed by sending the signer identity to a server, and receiving from the server an indication of whether the signer identity is an authorized signer identity or is not an authorized signer identity.

14. A non-transitory computer-readable medium that stores computer program instructions, where execution of the computer program instructions by at least one data processor results in the performance of operations that comprise:
    identifying an application installed on a device as an authorized application of a certain domain, where the certain domain is associated with a uniform resource identifier (URI), the application being signed with a private key;
    deriving a signer identity using a public key that forms a key pair with the private key;
    mapping the certain domain to another domain, where the another domain is associated with a uniform resource locator (URL);
    making a request to the another domain using the uniform resource locator (URL) to obtain a list of signer identities that are authorized to act on behalf of the certain domain;
    determining whether the signer of the application is in the list; and
    if it is, authorizing the application to act with the same privileges as granted in the certain domain.

15. An apparatus comprising:
    a processor; and
    a memory including computer program code, where the memory and computer program code are configured to, with the processor, cause the apparatus at least to,
    identify an application installed on a device as an authorized application of a certain domain, where the certain domain is associated with a uniform resource identifier (URI), the application being signed with a private key;
    derive a signer identity using a public key that forms a key pair with the private key;
    map the certain domain to another domain, where the another domain is associated with a uniform resource locator (URL);
    make a request to the another domain using the uniform resource locator (URL) to obtain a list of signer identities that are authorized to act on behalf of the certain domain;
    determine whether the signer of the application is in the list; and
    if it is, authorize the application to act with the same privileges as granted in the certain domain.

16. The apparatus of claim 15, where the application is one of self-signed or signed by a certificate authority.

17. The apparatus of claim 15, where the request is made when the application makes a claim to a resource.

18. The apparatus of claim 15, where the request is made each time the application starts, or each time a resource is used, or periodically.

19. The apparatus of claim 15, where a life time of the authorization is explicitly specified.

20. The apparatus of claim 17, where the resource is specified as part of a uniform resource locator sent to a network application function, where the uniform resource locator identifies the network application function.

21. The apparatus of claim 15, where the apparatus maps the certain domain to the another domain by the use of a deterministic function.

22. The apparatus of claim 15, where the apparatus derives the signer identity comprises one of using a hash of the public key, or using the public key directly, or using a hash of a public key certificate, or using the public key certificate directly.

23. The apparatus of claim 15, where an installation package of the application includes a self-signed certificate comprising the public key, where the self-signed certificate is signed with a private key forming a key pair with the public key.

24. The apparatus of claim 15, where the application is authorized to use a certain network application function identifier, embodied as a certain uniform resource locator, to generate a generic bootstrapping architecture key.

25. The apparatus of claim 15, where in response to a request to generate a generic bootstrapping architecture key a hash of the public key is sent from a generic bootstrapping architecture server to a network application function server, where the network application function server determines whether a signer of the application is authorized to gain access to the generic bootstrapping architecture key, and where the network application function server returns an indication depending on a result of the determination to the generic bootstrapping architecture server.

26. The apparatus of claim 25, further comprising the generic bootstrapping architecture server designating the signer of the application as trusted if access to the generic bootstrapping architecture key is authorized so that upon occurrence of a subsequent request the generic bootstrapping architecture server can derive and return the generic bootstrapping architecture key without first sending the hash of the public key to the network application function server.

27. The apparatus as in claim 15, where the operations of making a request and determining are performed by sending the signer identity to a server, and receiving from the server an indication of whether the signer identity is an authorized signer identity or is not an authorized signer identity.

* * * * *